US012573083B2

(12) United States Patent
Yamada

(10) Patent No.: US 12,573,083 B2
(45) Date of Patent: Mar. 10, 2026

(54) COMPUTER-READABLE RECORDING MEDIUM STORING OBJECT DETECTION PROGRAM, DEVICE, AND MACHINE LEARNING MODEL GENERATION METHOD OF TRAINING OBJECT DETECTION MODEL TO DETECT CATEGORY AND POSITION OF OBJECT

(71) Applicant: Fujitsu Limited, Kawasaki (JP)

(72) Inventor: Moyuru Yamada, Bangalore (IN)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 18/471,055

(22) Filed: Sep. 20, 2023

(65) Prior Publication Data

US 2024/0177341 A1 May 30, 2024

(30) Foreign Application Priority Data

Nov. 28, 2022 (JP) ................................. 2022-189541

(51) Int. Cl.
*G06T 7/73* (2017.01)
*G06V 10/22* (2022.01)
(Continued)

(52) U.S. Cl.
CPC ................ *G06T 7/73* (2017.01); *G06V 10/22* (2022.01); *G06V 10/443* (2022.01);
(Continued)

(58) Field of Classification Search
None
See application file for complete search history.

(56) References Cited

U.S. PATENT DOCUMENTS 12,380,319 B2 * 8/2025 Kohata .................. G06N 3/045
2018/0330238 A1 11/2018 Luciw et al.
(Continued)

FOREIGN PATENT DOCUMENTS

JP 2020-520007 7/2020
JP 2021-128797 9/2021
(Continued)

OTHER PUBLICATIONS

Zhang et al., "Weakly Supervised Object Localization and Detection: A Survey", IEEE Transactions on Pattern Analysis and Machine Intelligence, IEEE Computer Society, USA, vol. 44, No. 9, Apr. 20, 2021 (Apr. 20, 2021), pp. 5866-5885, XP011916158. Cited in EESR dated Jan. 15, 2024 for corresponding European Patent Application No. 23197125.0.

(Continued)

*Primary Examiner* — Tahmina N Ansari
(74) *Attorney, Agent, or Firm* — Fujitsu Intellectual Property Center

(57) ABSTRACT

A recording medium storing a program for causing a computer to execute processing including: acquiring, from a first model trained based on training data in which the first object is labeled in an image, a first portion specifying a region in an image that includes a first object; generating a third model by combining the first portion and a third portion of a second model being a model that includes a second portion and the third portion and that is trained based on training data in which position information regarding the second object is labeled in an image, the second portion being a portion that specifies a region in an image including a second object, the third portion being a portion that determines a position in an image of a specified region; and outputting a detection result of an object by inputting an image to the third model.

7 Claims, 20 Drawing Sheets

(51) Int. Cl.

| | | |
|---|---|---|
| *G06V 10/44* | (2022.01) | |
| *G06V 10/74* | (2022.01) | |
| *G06V 10/764* | (2022.01) | |
| *G06V 10/774* | (2022.01) | |

(52) U.S. Cl.
CPC ........ *G06V 10/761* (2022.01); *G06V 10/7753* (2022.01); *G06T 2207/20081* (2013.01); *G06V 10/764* (2022.01)

(56) References Cited

U.S. PATENT DOCUMENTS

| 2021/0150249 A1 | 5/2021 | Zheng et al. | |
|---|---|---|---|
| 2021/0256703 A1* | 8/2021 | Nakao ...................... | G06T 7/50 |
| 2021/0334701 A1* | 10/2021 | Chang .................. | G06V 10/764 |
| 2021/0390371 A1 | 12/2021 | Shankar et al. | |
| 2022/0180497 A1 | 6/2022 | Scheidegger et al. | |
| 2022/0375199 A1 | 11/2022 | Dey et al. | |
| 2023/0112287 A1* | 4/2023 | Kohata .................. | G06N 3/045 |
| | | | 382/155 |
| 2023/0377095 A1* | 11/2023 | Xiang ................... | G06T 3/4076 |
| 2024/0177341 A1* | 5/2024 | Yamada ............... | G06V 10/443 |
| 2024/0296660 A1* | 9/2024 | Okawa .................. | G06V 10/82 |

FOREIGN PATENT DOCUMENTS

| JP | 2022-019721 | 1/2022 | | |
|---|---|---|---|---|
| JP | 2022-090633 | 6/2022 | | |
| WO | 2018/208939 | 11/2018 | | |
| WO | 2018/232378 | 12/2018 | | |
| WO | 2019/010137 | 1/2019 | | |
| WO | WO-2023119664 A1 * | 6/2023 | ............. | G06V 10/82 |

OTHER PUBLICATIONS

Zhang et al., "Rethinking the Route Towards Weakly Supervised Object Localization", 2020 IEEE/CVF Conference on Computer Vision and Pattern Recognition (CVPR), IEEE, Jun. 13, 2020 (Jun. 13, 2020), pp. 13457-13466, XP033805593. Cited in EESR dated Jan. 15, 2024 for corresponding European Patent Application No. 23197125.0.

Pan et al., "On Decomposing a Deep Neural Network into Modules", Fourteenth ACM Conference on Recommender Systems, ACMPUB27, New York, NY, USA, Nov. 8, 2020 (Nov. 8, 2020), pp. 889-900, XP058622592. Cited in EESR dated Jan. 15, 2024 for corresponding European Patent Application No. 23197125.0.

Kirsch et al., "Modular Networks: Learning to Decompose Neural Computation", arXiv (Cornell University), Nov. 13, 2018 (Nov. 13, 2018), XP093113765. Cited in EESR dated Jan. 15, 2024 for corresponding European Patent Application No. 23197125.0.

EESR—Extended European Search Report dated Jan. 15, 2024 from corresponding European Patent Application No. 23197125.0 [10 pages].

* cited by examiner

Figure 7:
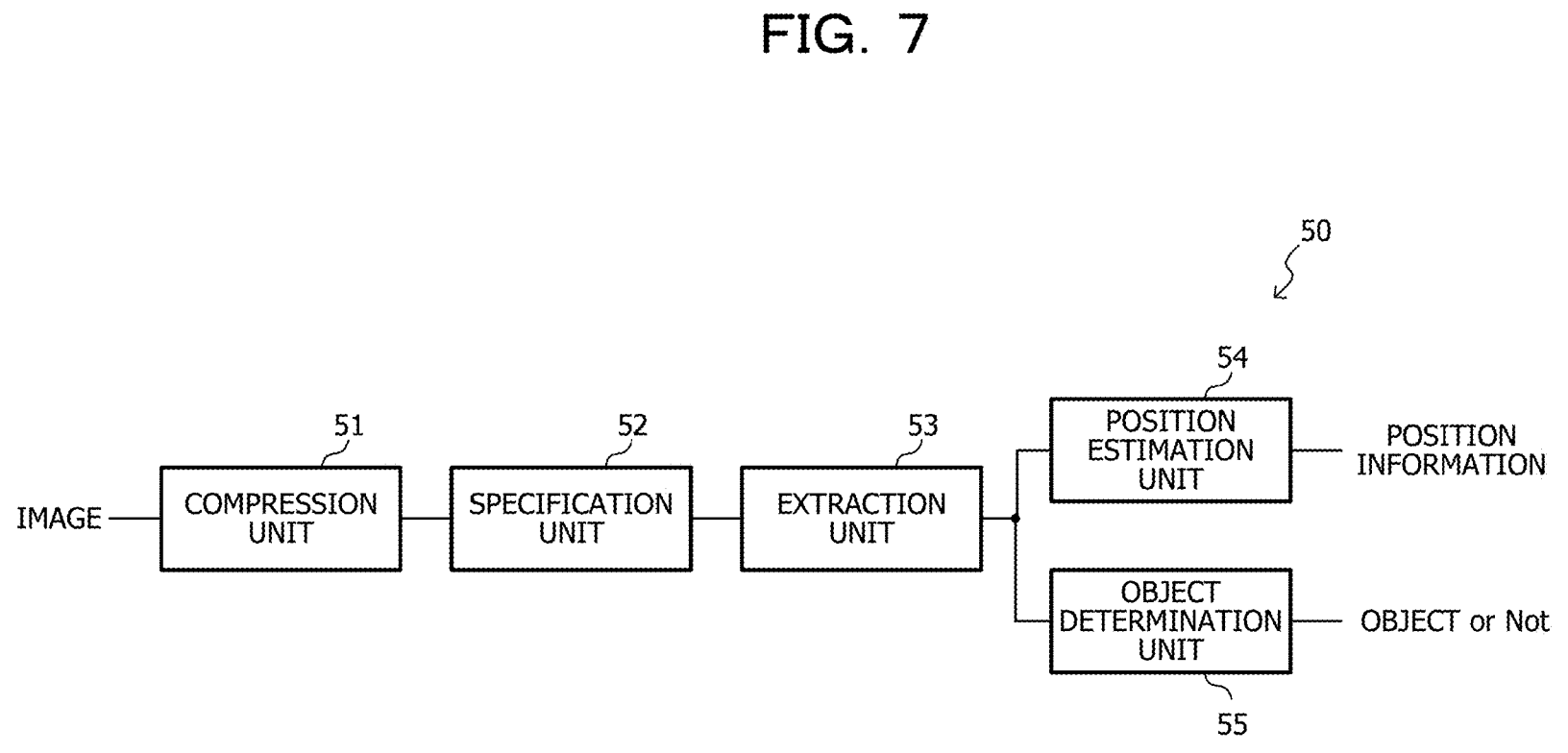

IMAGE ─ 51 COMPRESSION UNIT ─ 52 SPECIFICATION UNIT ─ 53 EXTRACTION UNIT

54 POSITION ESTIMATION UNIT ─ POSITION INFORMATION

55 OBJECT DETERMINATION UNIT ─ OBJECT or Not

FIG. 11

| NUMBER | OBJECT |
|--------|-----------|
| 0 | circle |
| 1 | rectangle |
| 2 | triangle |
| ... |  |

FIG. 12

| NUMBER | DETERMINATION RESULT |
|--------|----------------------|
| 0 | 1,0,0,··· |
| 1 | 0,0,1,··· |
| 2 | 0,1,0,··· |
| ··· | |

COMPUTER-READABLE RECORDING MEDIUM STORING OBJECT DETECTION PROGRAM, DEVICE, AND MACHINE LEARNING MODEL GENERATION METHOD OF TRAINING OBJECT DETECTION MODEL TO DETECT CATEGORY AND POSITION OF OBJECT

CROSS-REFERENCE TO RELATED APPLICATION

This application is based upon and claims the benefit of priority of the prior Japanese Patent Application No. 2022-189541, filed on Nov. 28, 2022, the entire contents of which are incorporated herein by reference.

FIELD

The embodiment discussed herein is related to a non-transitory computer-readable recording medium storing an object detection program, an object detection device, and a machine learning model generation method.

BACKGROUND

A neural network is widely used to estimate a position and a category of an object such as an object present in an image given as input. For example, a method for improving object detection in high-resolution images at inference time has been proposed. In this method, one or a plurality of processors receive a high-resolution image, and decompose the received image into hierarchically organized layers of images. Each layer includes at least one image tile of the received image, and each of the image tiles have a corresponding resolution suitable to a baseline image recognition algorithm. Furthermore, in this method, one or a plurality of processors execute a result aggregation of results of baseline algorithm applications to the respective image tiles of the respective layers.

Furthermore, for example, a device for determining and utilizing corrections to robot actions has been proposed. This device updates a local features model of a robot in response to determining a human correction of an action executed by a robot. The local features model is used to determine, based on an embedding generated over a corresponding neural network model, one or more features that are most similar to the generated embedding.

Furthermore, for example, an image processing system that determines a position of an object belonging to a specific category has been proposed. To identify an object within an image or a video segment, this system identifies one or a plurality of regions of an image that include an object. Furthermore, this system utilizes a deep learning based object detection framework and similar object search framework that models correlations present between various object categories. Additionally, this system determines a category for each object detected using a hierarchical tree of categories to perform training of visual similarities between various object categories. The hierarchical tree is estimated by analyzing errors of an object detector which does not use any correlation between the object categories.

Furthermore, for example, a lifelong deep neural network (L-DNN) technology that performs fast, post-deployment learning without extensive training, heavy computing resources, or massive data storage has been proposed. The L-DNN technology uses a representation-rich, DNN-based subsystem (Module A) with a fast-learning subsystem (Module B) to learn new features quickly without forgetting previously learned features.

Japanese Laid-open Patent Publication No. 2022-90633, Japanese Laid-open Patent Publication No. 2022-19721, Japanese Laid-open Patent Publication No. 2021-128797, and Japanese National Publication of International Patent Application No. 2020-520007 are disclosed as related art.

SUMMARY

According to an aspect of the embodiments, there is provided a non-transitory computer-readable recording medium storing an object detection program for causing a computer to execute processing including: acquiring, from among a first machine learning model, a first machine learning model portion that specifies a region in an image that includes a first object, the first machine learning model being a model trained based on training data in which the first object is labeled in an image; generating a third machine learning model by combining the first machine learning model portion and a third machine learning model portion of a second machine learning model, the second machine learning model being a model that includes a second machine learning model portion and the third machine learning model portion and that is trained based on training data in which position information regarding the second object is labeled in an image, the second machine learning model portion being a machine learning model portion that specifies a region in an image that includes a second object, the third machine learning model portion being a machine learning model portion that determines a position in an image of a specified region; and outputting a detection result of an object by inputting an image to the third machine learning model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a detailed functional block diagram of an output unit;

FIG. 11 is a diagram illustrating an example of a module list;

FIG. 12 is a diagram illustrating an example of a determination result as to whether or not an area is an object;

DESCRIPTION OF EMBODIMENTS

However, when retraining is performed on a machine learning model that detects an object from an image so that a new object may be detected, detection accuracy of an object that has been a detection object before the retraining may be deteriorated.

As one aspect, an object of the disclosed technology is to reduce deterioration of detection accuracy of an object.

Hereinafter, an example of an embodiment according to the disclosed technology will be described with reference to the drawings.

An object detector that is a machine learning model configured by a deep neural network or the like and that detects an object such as an object from an image needs to be trained by using training data in which an image is associated with information regarding a position and a category of an object in the image. In training data publicly available, for example, a category of an object is limited such that a dog and a person are included but a stroller is not included, or the like, and an object that a user wants to detect is not included in many cases. Thus, for the object detector trained with the public training data, there is a demand for changing the detection object, such as adding, as the detection object, a category that does not present in the public training data, or deleting, from the detection object, an unnecessary category that is likely to be erroneously recognized. Furthermore, even in a case where the detection object is changed, it is desirable to maintain detection accuracy of an object that has been the detection object before the change of the detection object. Moreover, there is also a demand for minimizing a work cost for creating training data needed for adding the detection object to the object detector and performing retraining.

Figure 1:
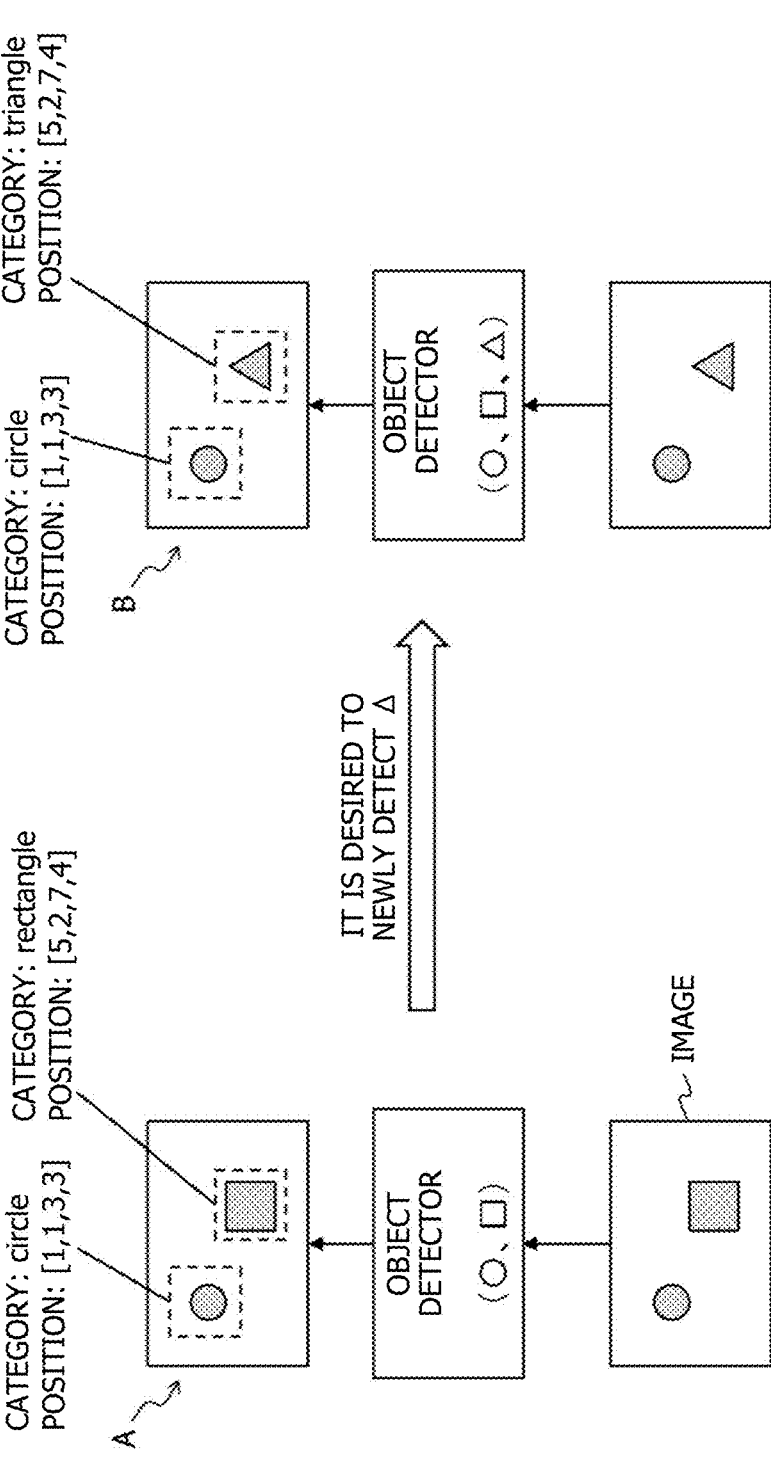
FIG. 1 is a diagram for describing addition of a detection object to a common object detector.

Here, it is assumed that there is an object detector trained by using public training data as illustrated in a left diagram in FIG. 1. In FIG. 1, circles, rectangles, triangles, and the like in images schematically represent objects having different categories from each other. In the present embodiment, description will be made assuming that a category of the object "circle" is "circle", a category of the object "rectangle" is "rectangle", and a category of the object "triangle" is "triangle". The object detector in the left diagram in FIG. 1 is an object detector trained with the categories of the detection objects as the "circle" and the "rectangle". In order to train the object detector, it is needed to use training data in which position information regarding the objects in the image is associated with the categories of the objects, as illustrated in A in the left diagram in FIG. 1. Note that, in the present embodiment, by using start point coordinates (for example, coordinates of an upper left corner) (x, y) of a bounding box surrounding an object and a height and a width (Bh, Bw) of the bounding box, position information regarding the object is represented as [x, y, Bh, Bw].

In a case where it is desired to newly detect the object of the category "triangle" by using the object detector illustrated in the left diagram in FIG. 1, as illustrated in B in a right diagram in FIG. 1, it is needed to prepare, as training data, an image in which a category and position information of the addition object are associated with each other. Furthermore, it is needed to retrain the entire object detector by using a training data set in which the training data of the category of the addition object is added to the original training data. In the case where the entire object detector is retrained, detection accuracy of the detection object before the retraining may be deteriorated.

Figure 2:
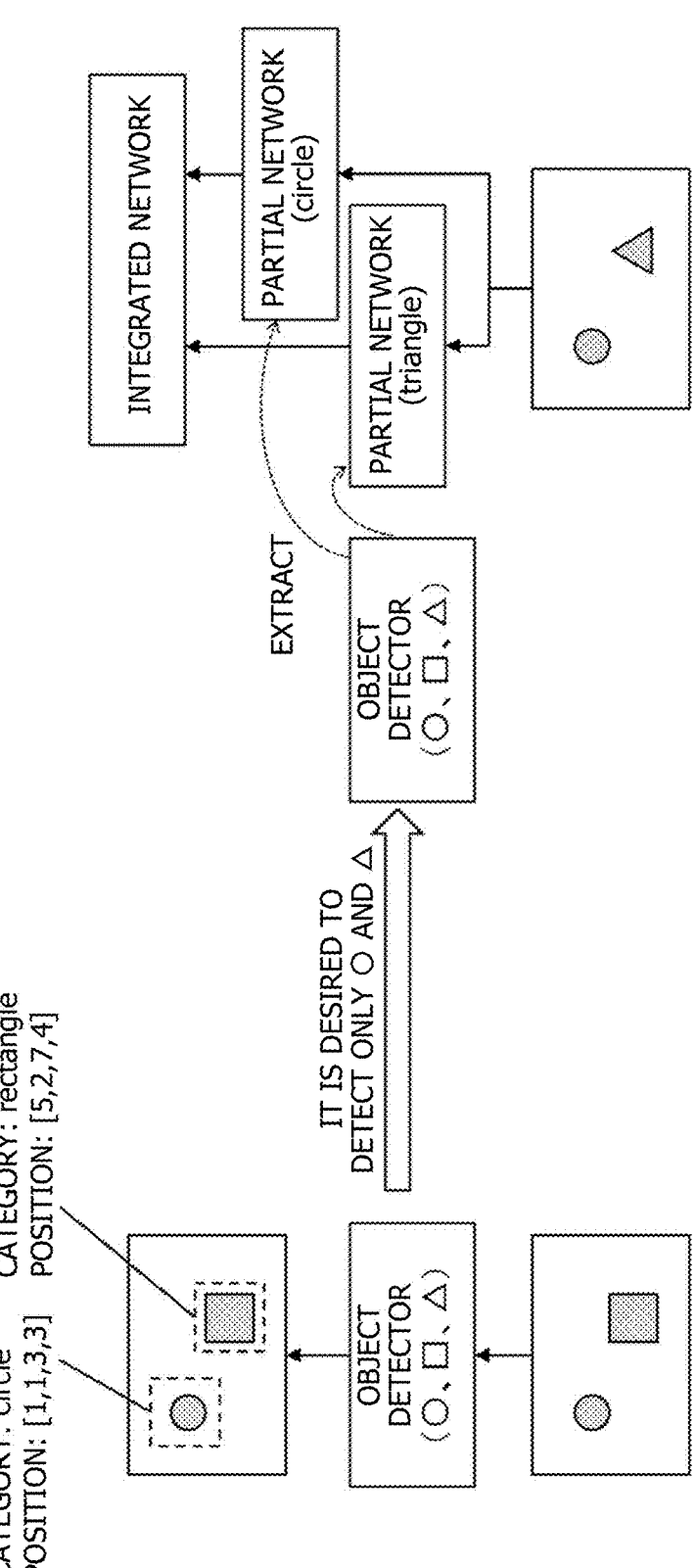
FIG. 2 is a diagram for describing addition of a detection object to a common object detector.

Furthermore, for example, it is assumed that there is an object detector trained with categories of detection objects as "circle", "rectangle", and "triangle", as illustrated in a left diagram in FIG. 2. It is assumed that it is desired to detect only the "circle" and the "triangle" by using the object detector, in other words, it is desired to delete the "rectangle". In this case, it is conceivable to extract, from the object detector, a partial network for detecting the "circle" and a partial network for detecting the "triangle". This method may reduce the number of detection objects from the original object detector, but it is not considered to increase the number of detection objects. Furthermore, this method needs additional training of an integrated network for integrating the extracted partial networks, and needs a work cost.

Thus, in the present embodiment, by adding modules that extract only specific objects to the object detector, and enabling free selection of a module according to an object desired to be detected, it is possible to make retraining of an entire object detector unnecessary and maintain detection accuracy of the detection object before retraining. Furthermore, by enabling training of a module for each category of an object with training data without position information, the present embodiment reduces a work cost needed for training. Hereinafter, an object detection device according to the present embodiment will be described in detail.

Figure 3:
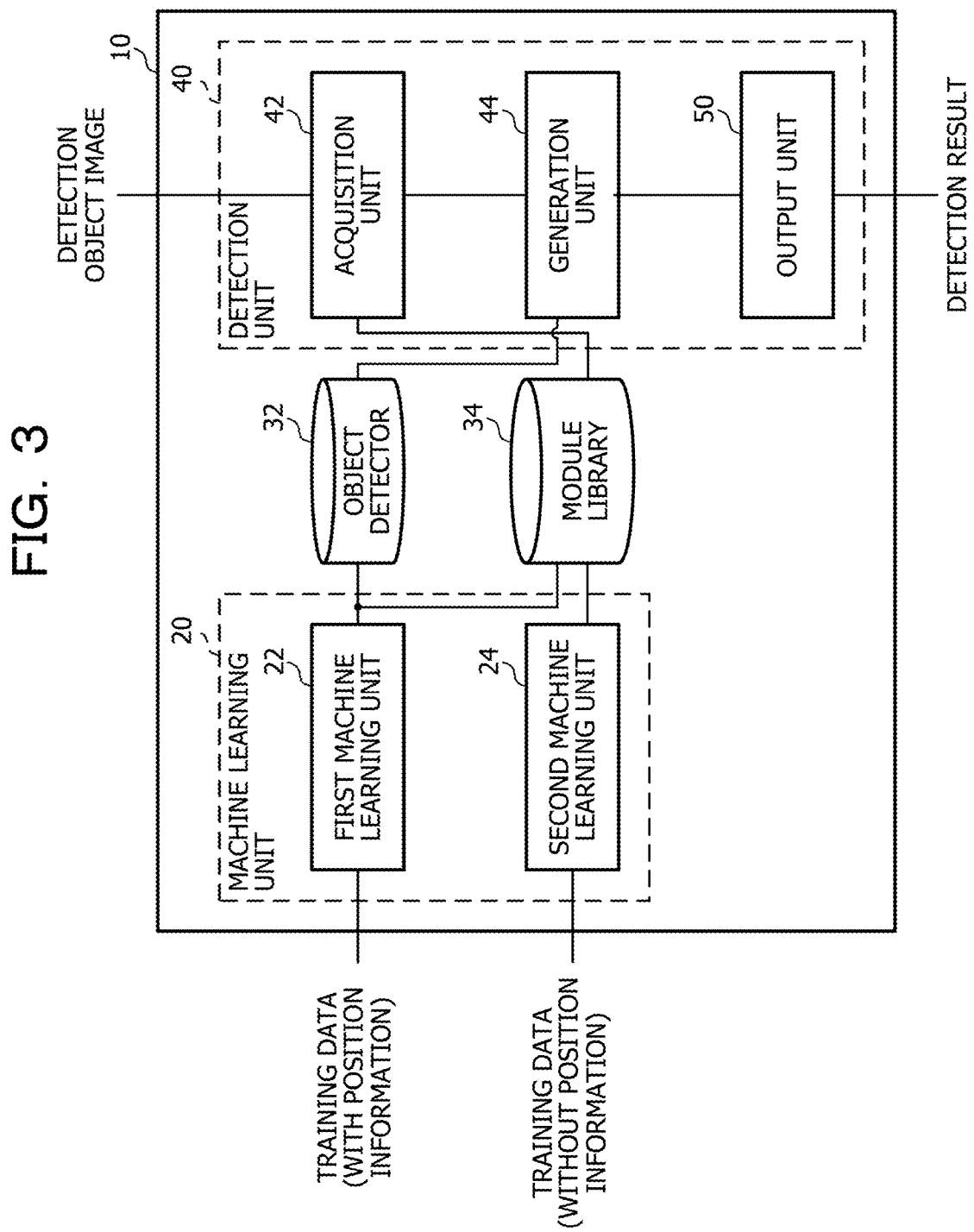
FIG. 3 is a functional block diagram of an object detection device according to the present embodiment.

As illustrated in FIG. 3, an object detection device 10 functionally includes a machine learning unit 20 and a detection unit 40. The machine learning unit 20 and the detection unit 40 are examples of a "control unit" of the disclosed technology. The machine learning unit 20 further includes a first machine learning unit 22 and a second machine learning unit 24. The detection unit 40 further includes an acquisition unit 42, a generation unit 44, and an output unit 50. Furthermore, an object detector 32 and a module library 34 are stored in a predetermined storage region of the object detection device 10.

First, the machine learning unit 20 will be described.

Figure 4:
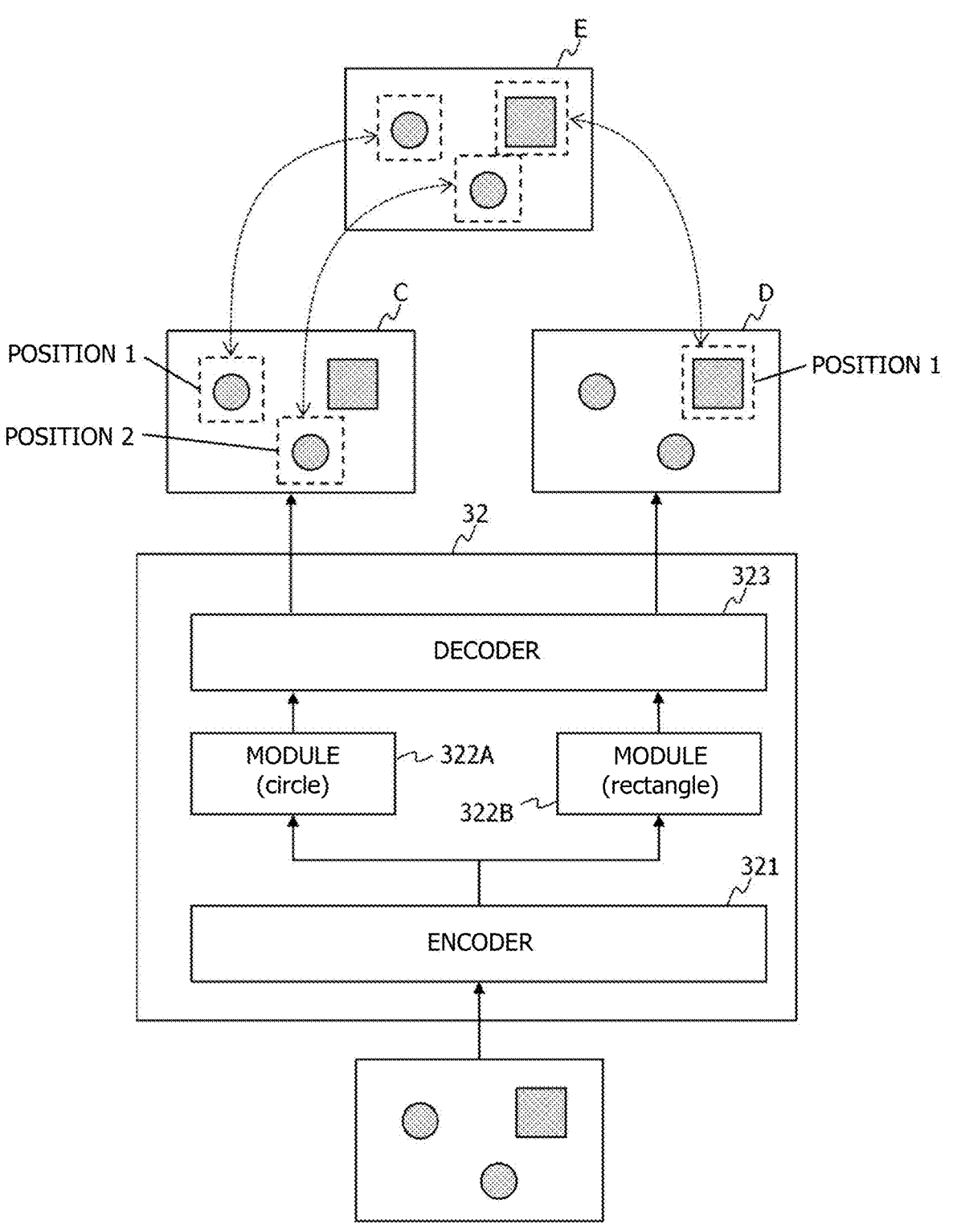
FIG. 4 is a schematic configuration diagram of an object detector according to the present embodiment.

The first machine learning unit 22 uses training data in which position information regarding objects in an image is associated with categories of the objects (hereinafter, referred to as "training data with position information") to train the object detector 32. FIG. 4 schematically illustrates a configuration of the object detector 32. As illustrated in FIG. 4, the object detector 32 includes an encoder 321, modules 322, and a decoder 323. The encoder 321 is a neural network that generates an image feature matrix obtained by compressing and converting an input image. For example, the encoder 321 generates, by compressing and converting an input image, an image feature matrix in a format that may be processed by the modules 322, in which each element is a vector of a specific dimension.

The module 322 is a neural network that specifies, based on output of the encoder 321, a region indicating an object in an image for each category of a detection object. The function of specifying the region indicating the object in the image may be implemented by, for example, an attention mechanism. For example, it is assumed that categories of objects included in training data with position information acquired by the first machine learning unit 22 are "circle" and "rectangle". In this case, as illustrated in FIG. 4, the object detector 32 includes a module 322A that specifies a region in an image of the "circle" and a module 322B that specifies a region in an image of the "rectangle". In a case where the modules for the respective categories are described without distinction, they are simply referred to as the "module 322".

The decoder 323 is a neural network that determines a position in an image of a region specified by the module 322 based on output of the module 322, determines a likelihood that the specified region is a detection object, and outputs the likelihood as a detection result. For example, in a case where it is determined that the likelihood of the detection object is equal to or greater than a threshold based on output of the module 322A, the "circle" is detected from the image. The object detector 32 is an example of a "second machine learning model" of the disclosed technology, the module 322 is an example of a "second machine learning model portion" of the disclosed technology, and the decoder 323 is an example of a "third machine learning model portion" of the disclosed technology.

The first machine learning unit 22 inputs an image of training data to the object detector 32, and acquires a detection result output from the decoder 323. The first machine learning unit 22 trains the object detector 32 by updating parameters of each of the encoder 321, the modules 322, and the decoder 323 so as to minimize an error between the acquired detection result and a correct answer indicated by the training data.

In the example in FIG. 4, when calculating the error described above, the first machine learning unit 22 compares a position 1 and a position 2, which are the detection results for a region specified by the module 322A (C in FIG. 4), with position information associated with the "circles" of the training data (E in FIG. 4). Furthermore, the first machine learning unit 22 compares a position 1, which is the detection result for a region specified by the module 322B (D in FIG. 4), with position information associated with the "rectangle" of the training data (E in FIG. 4).

The first machine learning unit 22 stores the trained object detector 32 in the predetermined storage region of the object detection device 10. Furthermore, the first machine learning unit 22 stores the modules 322 in the trained object detector 32 in the module library 34.

Figure 5:
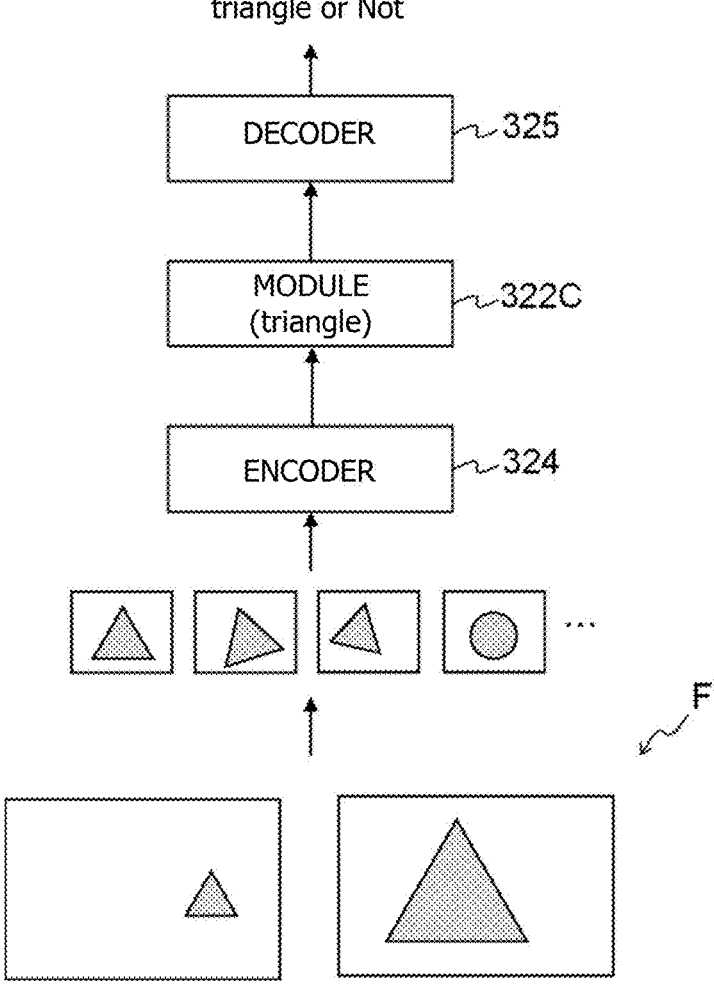
FIG. 5 is a diagram for describing training of a module.

The second machine learning unit 24 uses training data that has only a correct answer of a category of an object and does not have position information of the object in an image (hereinafter, referred to as "training data without position information") to train a module of an object desired to be added to the object detector 32. As illustrated in FIG. 5, the second machine learning unit 24 trains a machine learning model including an encoder 324, a module 322C, and a decoder 325 by using the training data without position information.

The encoder 324 is an encoder that has been trained by the first machine learning unit 22. The decoder 325 is a neural network that determines presence or absence of an object based on output of the module 322C. Specifically, the decoder 325 is created by performing training to update only parameters of the decoder by using the encoder trained by the first machine learning unit 22 and any one of trained modules. Note that, in a case where training data with position information is used in the second machine learning unit 24, a decoder trained by the first machine learning unit 22 may be used as it is as the decoder 325. FIG. 5 illustrates an example of a machine learning model including the module 322C of an object desired to be added "triangle". This machine learning model is an example of a "first machine learning model" of the disclosed technology, and the module 322C is an example of a "first machine learning model portion" of the disclosed technology.

As illustrated in F in FIG. 5, the second machine learning unit 24 inputs, to the encoder 324, images (positive examples) of an object desired to be added (here, "triangle") included in images in various sizes and images (negative examples) other than the object desired to be added. The second machine learning unit 24 trains the machine learning model by updating parameters of the module 322C so that output of the decoder 325 matches a correct answer. Specifically, the second machine learning unit 24 trains the machine learning model so that the decoder 325 outputs, in a case where an image of a positive example is input, a determination result indicating that the image is the object, and the decoder 325 outputs, in a case where an image of a negative example is input, a determination result indicating that the image is not the object. Furthermore, the second machine learning unit 24 trains the module 322 to hold a vector representing a feature of the object and a vector corresponding to a mark (details will be described later) added to a region having the feature. The second machine learning unit 24 stores the modules 322 in the trained machine learning model in the module library 34.

Next, the detection unit 40 will be described.

The acquisition unit 42 acquires, from the module library 34, one or a plurality of modules 322 for an object desired to be added or changed as a detection object for the object detector 32, and passes the one or the plurality of modules 322 to the generation unit 44.

The generation unit 44 acquires the object detector 32, and combines the encoder 321 and the decoder 323 included in the object detector 32 with the module 322 passed from the acquisition unit 42 to generate a new object detector 36. The new object detector 36 is an example of a "third machine learning model" of the disclosed technology. Specifically, in a case where a new detection object is added, the generation unit 44 adds the module 322 to the object detector 32 to generate the object detector 36. Furthermore, in a case where a detection object is changed, the generation unit 44 generates the object detector 36 by exchanging the original module 322 of the object detector 32 with the module 322 passed from the acquisition unit 42.

Figure 6:
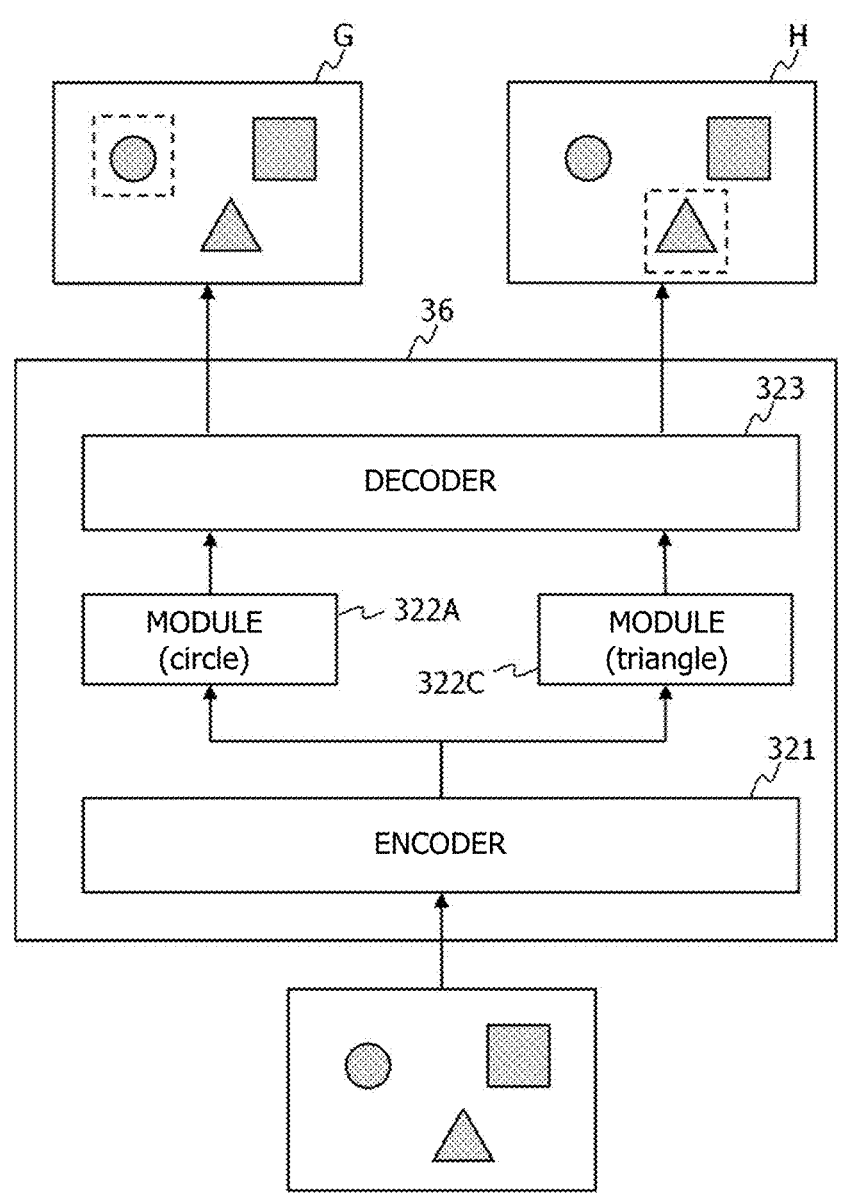
FIG. 6 is a diagram illustrating an example of the object detector generated by changing the module.

FIG. 6 illustrates an example of the object detector 36 generated by changing the module 322B of the object detector 32 illustrated in FIG. 4 to the module 322C. In other words, the object detector 36 is changed from the object detector 32 trained to detect the "circle" and the "rectangle" to detect the "circle" and the "triangle". The module 322C of the "triangle" has been trained with training data without position information, and the new object detector 36 may be generated by only exchanging the module 322 and without retraining the object detector 32.

The output unit 50 outputs a detection result of an object by inputting an image to be subjected to processing of detecting an object (hereinafter, referred to as a "detection object image") to the object detector 36. More specifically, as illustrated in FIG. 7, the output unit 50 includes a compression unit 51, a specification unit 52, an extraction unit 53, a position estimation unit 54, and an object determination unit 55. The compression unit 51 is a functional unit implemented by the encoder 321, the specification unit 52 is a functional unit implemented by the module 322, and the extraction unit 53, the position estimation unit 54, and the object determination unit 55 are functional units implemented by the decoder 323.

Figure 8:
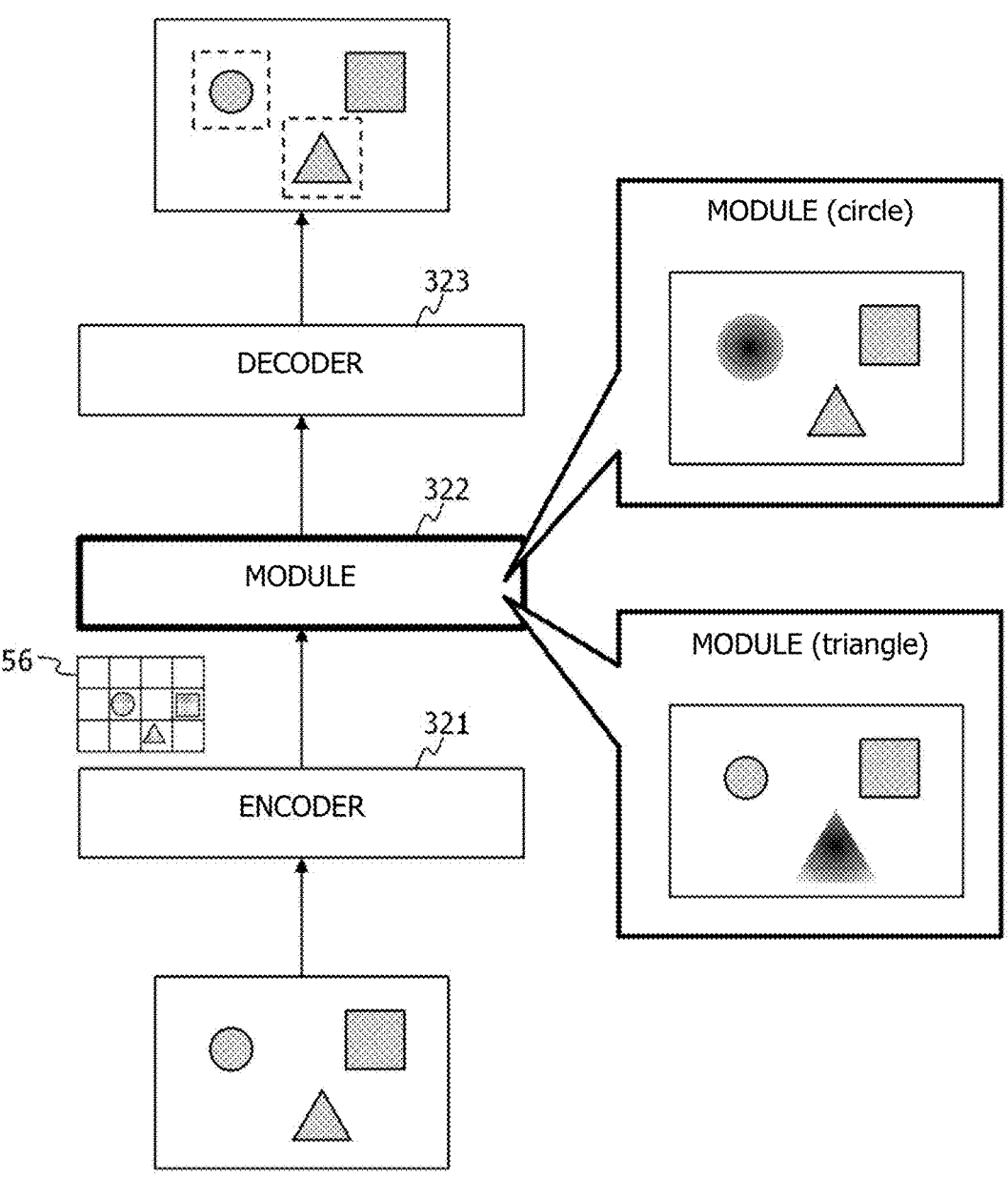
FIG. 8 is a diagram for describing processing by the object detector.

The compression unit 51 generates an image feature matrix 56 by inputting an image to the encoder 321, as illustrated in FIG. 8. Note that FIG. 8 illustrates an example of the 4×3 element image feature matrix 56. In FIG. 8, in order to simplify the description, the image feature matrix 56 and the image are represented in association with each other, but each element (each cell) of the image feature matrix 56 holds a value representing a feature of an image portion corresponding to the element. The same similarly applies to the drawings below.

Figure 9:
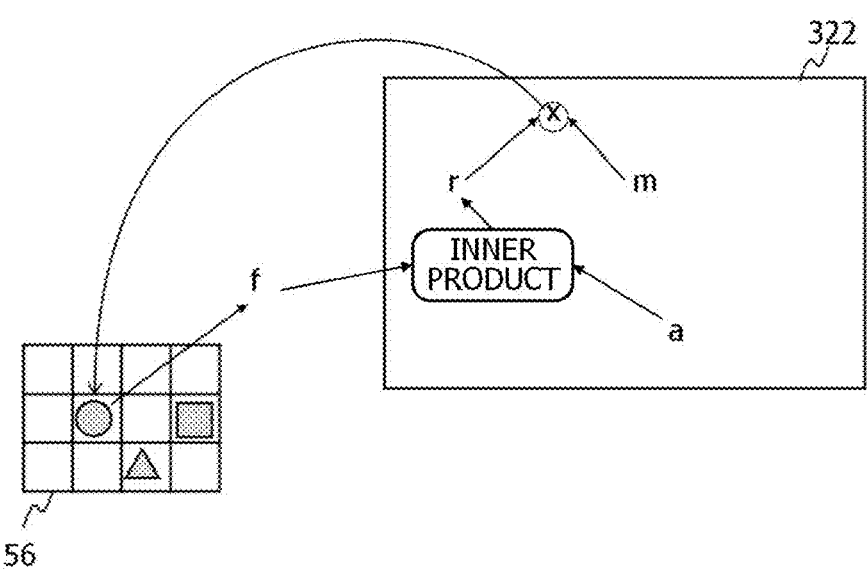
FIG. 9 is a diagram for describing processing by the module.

The specification unit 52 specifies a region of an object in the image by inputting the image feature matrix 56 generated by the encoder 321 to each of the modules 322. Specifically, as illustrated in FIG. 9, the specification unit 52 calculates similarity (for example, an inner product) r between a vector a representing a feature of the object, which is held by the module 322, and a value f of each element of the image feature matrix 56. Then, the specification unit 52 adds a value obtained by multiplying the similarity r by a vector m corresponding to a mark to the value of the element of the image feature matrix 56. The specification unit 52 executes this processing for each element of the image feature matrix 56.

The image feature matrix 56 in a state where the processing by the specification unit 52 is completed for all the elements is output from the module 322. In other words, the value obtained by multiplying the similarity r by the vector m corresponding to the mark corresponds to a mark for specifying the region of the object. A density of the mark (the value added to the element) changes according to the similarity between the image portion corresponding to each element and the vector a representing the feature of the object held by the module 322 of the object. FIG. 8 conceptually illustrates a state where the mark is added to the region of the object corresponding to each module 322 in the image.

The extraction unit 53 extracts the region of the object in the image feature matrix 56, to which the mark is added. For example, the extraction unit 53 extracts an element to which a value equal to or greater than a predetermined value is added as the mark in the image feature matrix 56. Then, the extraction unit 53 extracts a region corresponding to the extracted element, or in a case where the extracted elements are adjacent to each other, a region corresponding to an element group in which the adjacent elements are coupled to each other, as the region of the object.

Figure 10:
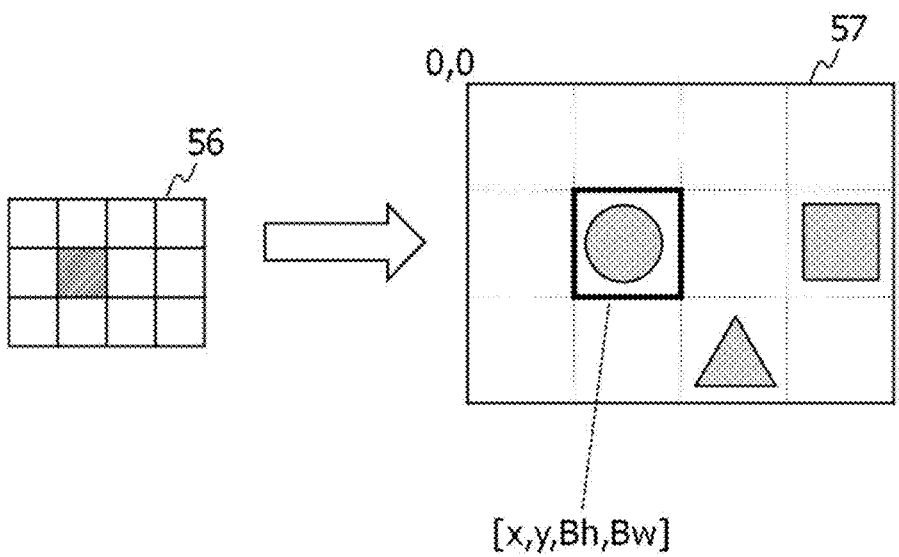
FIG. 10 is a diagram for describing processing by a decoder.

The position estimation unit 54 estimates, based on the region in the image feature matrix 56 extracted by the extraction unit 53, a position of the region in the image. Specifically, as illustrated in FIG. 10, the position estimation unit 54 estimates position information [x, y, Bh, Bw] of an image 57 corresponding to the region (hatched cell in FIG. 10) extracted from the image feature matrix 56.

The object determination unit 55 determines whether or not the region extracted by the extraction unit 53 is the object. Specifically, the object determination unit 55 holds a module list as illustrated in FIG. 11. In the example in FIG. 11, a number for identifying the module 322 and a category of an object specified by the module 322 are associated with each other and listed. As illustrated in FIG. 12, the object determination unit 55 determines whether or not the region is the object for each region specified by each module 322. In the example in FIG. 12, a number defined in the module list for the module 322 that has specified the region is associated with a determination result of "1" in a case where the region is the object, and a determination result of "0" in a case where the region is not the object. Note that, in a case where it is determined to detect a maximum of N objects from one image, the determination result is a list of N 1's or 0's.

The output unit 50 outputs the position information estimated by the position estimation unit 54 and the determination result determined by the object determination unit 55 as the detection result of the object from the image. In FIG. 6, a detection result for a region specified by the module 322A is represented by G, and a detection result for a region specified by the module 322C is represented by H.

Figure 13:
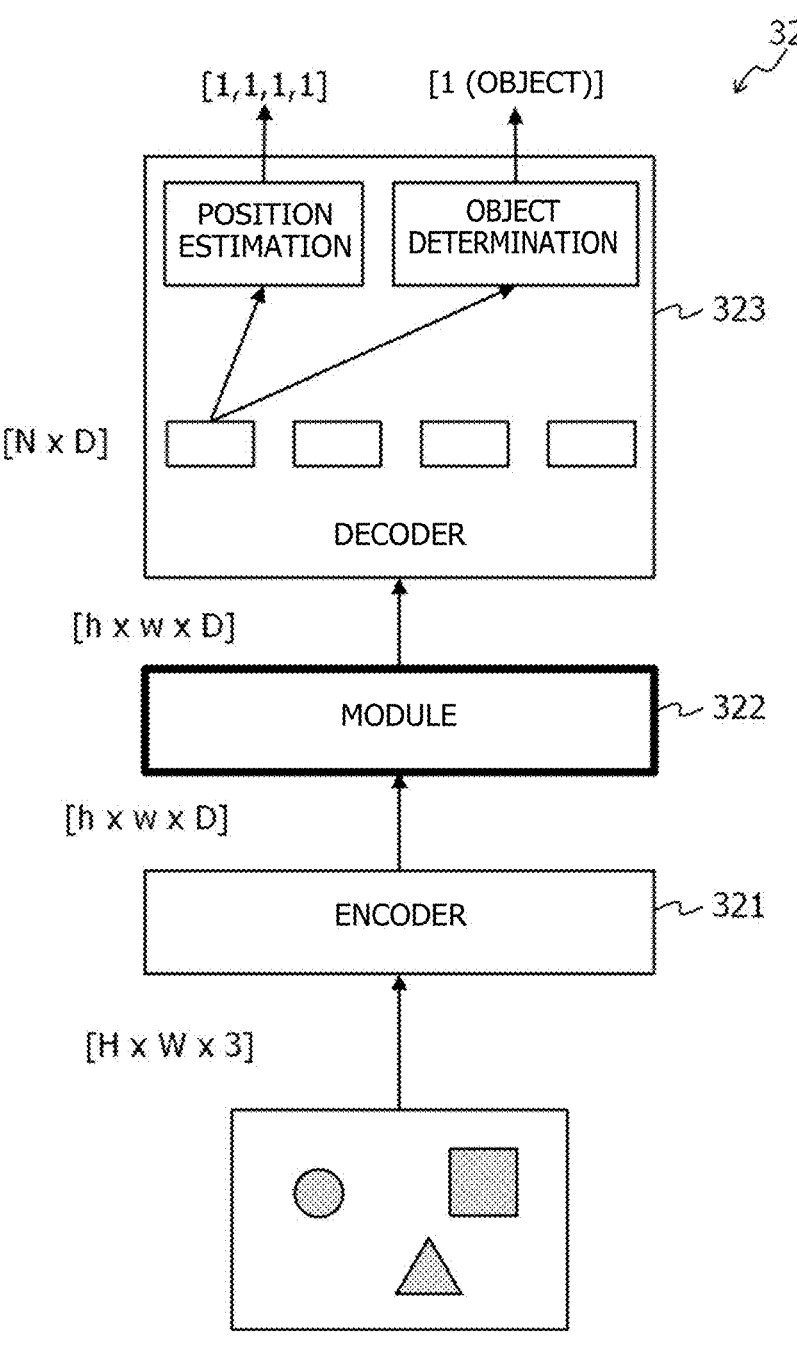
FIG. 13 is a diagram for describing the processing by the object detector.

The processing in the object detector 36 will be described more specifically with reference to FIG. 13. For example, in a case where an RGB image having a height H and a width W is a detection object image, an image having a size [H×W×3 (RGB)] is input to the encoder 321, and the image feature matrix 56 having a size [h×w×D] is output from the encoder 321. D is a dimension of a vector, for example, 256. In the module 322, since a mark indicating a region of an object is added to each element of the image feature matrix 56, a size of data output from the module 322 is also [h×w×D]. The decoder 323 calculates D-dimensional vectors corresponding to the maximum detection number N (in the example in FIG. 13, N=4). For example, as illustrated in a left diagram in FIG. 10, in a case where one element of the image feature matrix 56 is specified as the region of the object and N=4 is satisfied, the decoder 323 generates a value of the element as a first D-dimensional vector and sets all the elements of the remaining three D-dimensional vectors to 0. Furthermore, in a case where the specified region is a region corresponding to an element group in which adjacent elements are coupled to each other, the decoder 323 generates D-dimensional vectors by averaging values of the elements included in the region, or the like. Based on each of the generated D-dimensional vectors, the decoder 323 performs position estimation and outputs position information, and determines whether or not the region is the object and outputs a determination result.

Figure 14:
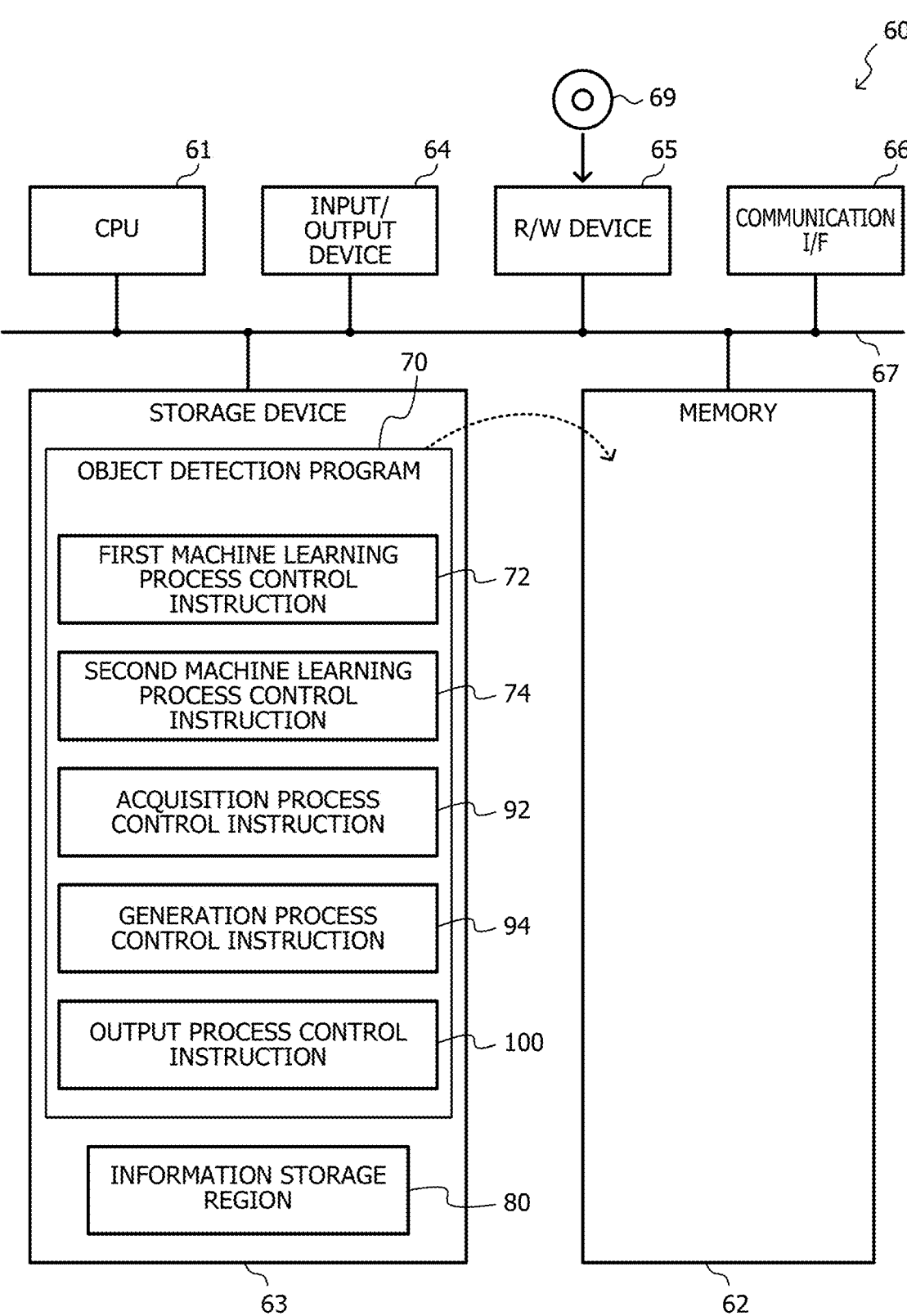
FIG. 14 is a block diagram illustrating a schematic configuration of a computer that functions as the object detection device.

The object detection device 10 may be implemented by, for example, a computer 60 illustrated in FIG. 14. The computer 60 includes a central processing unit (CPU) 61, a memory 62 as a temporary storage region, and a nonvolatile storage device 63. Furthermore, the computer 60 includes an input/output device 64 such as an input device and a display device, and a read/write (R/W) device 65 that controls reading and writing of data from and to a storage medium 69. Furthermore, the computer 60 includes a communication interface (I/F) 66 to be coupled to a network such as the Internet. The CPU 61, the memory 62, the storage device 63, the input/output device 64, the R/W device 65, and the communication I/F 66 are coupled to one another via a bus 67.

The storage device 63 is, for example, a hard disk drive (HDD), a solid state drive (SSD), a flash memory, or the like.

The storage device 63 as a storage medium stores an object detection program 70 for causing the computer 60 to function as the object detection device 10. The object detection program 70 includes a first machine learning process control instruction 72, a second machine learning process control instruction 74, an acquisition process control instruction 92, a generation process control instruction 94, and an output process control instruction 100. Furthermore, the storage device 63 includes an information storage region 80 in which information constituting each of the modules 322 stored in the object detector 32 (36) and the module library 34 is stored.

The CPU 61 reads the object detection program 70 from the storage device 63, expands the object detection program 70 in the memory 62, and sequentially executes control instructions included in the object detection program 70. The CPU 61 operates as the first machine learning unit 22 illustrated in FIG. 3 by executing the first machine learning process control instruction 72. Furthermore, the CPU 61 operates as the second machine learning unit 24 illustrated in FIG. 3 by executing the second machine learning process control instruction 74. Furthermore, the CPU 61 operates as the acquisition unit 42 illustrated in FIG. 3 by executing the acquisition process control instruction 92. Furthermore, the CPU 61 operates as the generation unit 44 illustrated in FIG. 3 by executing the generation process control instruction 94. Furthermore, the CPU 61 operates as the output unit 50 illustrated in FIG. 3 by executing the output process control instruction 100. Furthermore, the CPU 61 reads information from the information storage region 80, and expands each of the modules 322 stored in the object detector 32 (36) and the module library 34 in the memory 62. With this configuration, the computer 60 that has executed the object detection program 70 functions as the object detection device 10. Note that the CPU 61 that executes the program is hardware.

Note that the functions implemented by the object detection program 70 may be implemented by, for example, a semiconductor integrated circuit, more specifically, an application specific integrated circuit (ASIC), a field-programmable gate array (FPGA), or the like.

Figure 15:
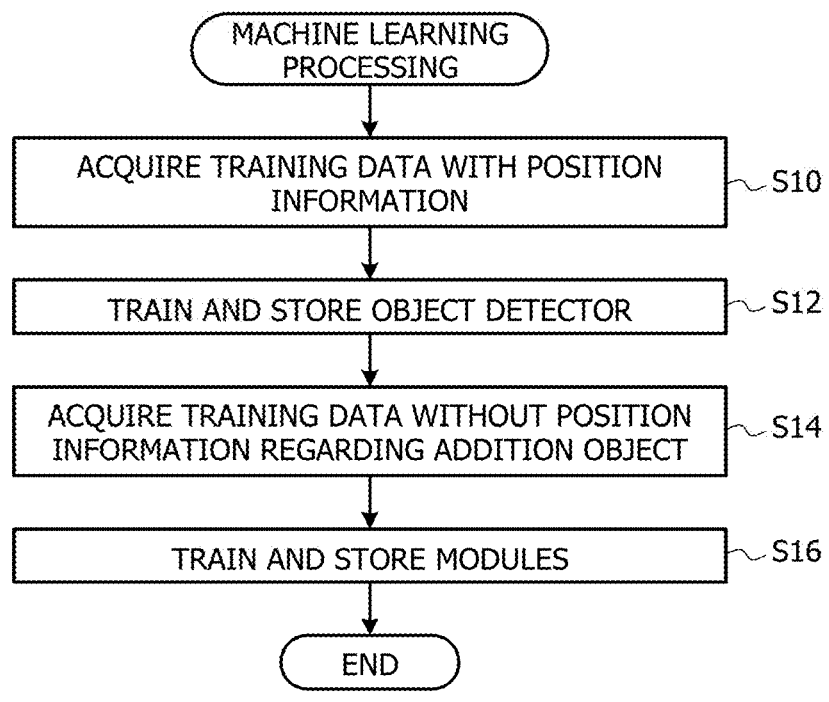
FIG. 15 is a flowchart illustrating an example of machine learning processing.
Figure 16:
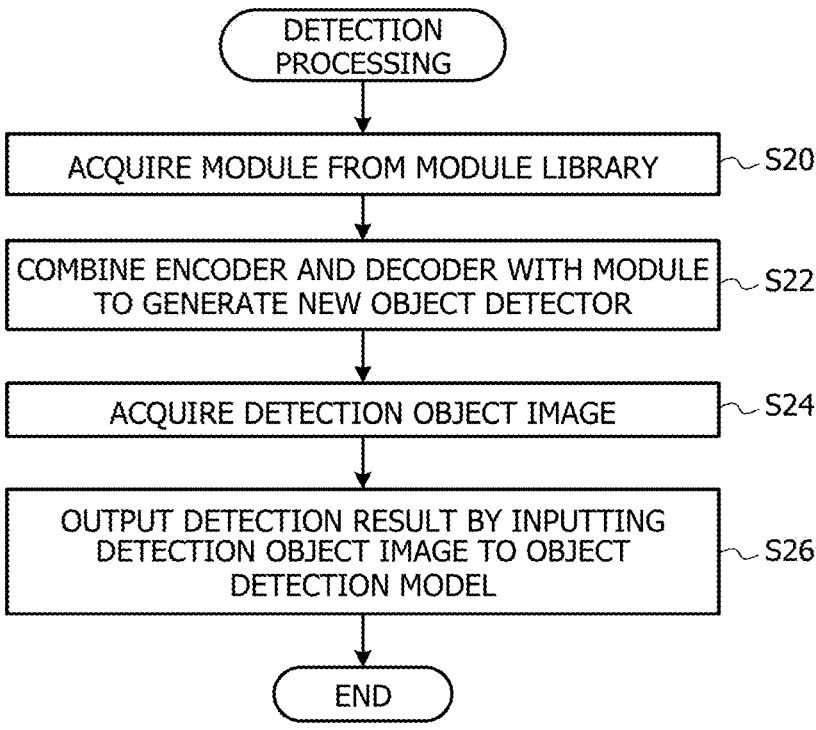
FIG. 16 is a flowchart illustrating an example of detection processing.

Next, operation of the object detection device 10 according to the present embodiment will be described. When training data is input to the object detection device 10 and training of the object detector 32 and the modules 322 is instructed, machine learning processing illustrated in FIG. 15 is executed in the object detection device 10. Furthermore, when a detection object image is input to the object detection device 10 and detection of an object is instructed, detection processing illustrated in FIG. 16 is executed in the object detection device 10.

First, the machine learning processing illustrated in FIG. 15 will be described.

In Step S10, the first machine learning unit 22 acquires training data with position information. Next, in Step S12, the first machine learning unit 22 trains the object detector 32 by using the training data with position information. Then, the first machine learning unit 22 stores the trained object detector 32 in a predetermined storage region of the object detection device 10, and stores the modules 322 in the trained object detector 32 in the module library 34.

Next, in Step S14, the second machine learning unit 24 acquires training data without position information regarding an object desired to be added to the object detector 32. Next, in Step S16, the second machine learning unit 24 trains, in a machine learning model including the encoder 324, the modules 322, and the decoder 325, the machine learning model by updating parameters of the modules 322 by using the training data without position information. Then, the second machine learning unit 24 stores the modules 322 in the trained machine learning model in the module library 34, and the machine learning processing ends.

Note that the training of the object detector 32 (Steps S10 and S12) and the training of the modules 322 (Steps S14 and S16) may be executed at different timings from each other, or may be executed in parallel.

Next, the detection processing illustrated in FIG. 16 will be described.

In Step S20, the acquisition unit 42 acquires, from the module library 34, the module 322 for an object desired to be added or changed as a detection object for the object detector 32. Next, in Step S22, the generation unit 44 acquires the object detector 32, and combines the encoder 321 and the decoder 323 included in the object detector 32 with the module 322 acquired in Step S20 described above to generate the new object detector 36.

Next, in Step S24, the acquisition unit 42 acquires a detection object image input to the object detection device 10. Next, in Step S26, the output unit 50 outputs a detection result of the object by inputting the detection object image to the object detector 36, and the detection processing ends.

As described above, the object detection device according to the present embodiment acquires the module of the object to be added to or changed in the object detector that is the existing machine learning model trained based on the training data with position information among the modules trained based on the training data without position information. Furthermore, the object detection device combines the encoder and the decoder of the existing object detection device with the acquired module to generate the new object detector, and inputs the detection object image to the new object detector, thereby outputting the detection result of the object. With this configuration, even in a case where a detection object in the machine learning model that detects an object from an image is changed, it is possible to reduce deterioration in detection accuracy of the detection object before the change. Furthermore, a work cost for retraining so that a new object may be detected may be reduced.

Figure 17:
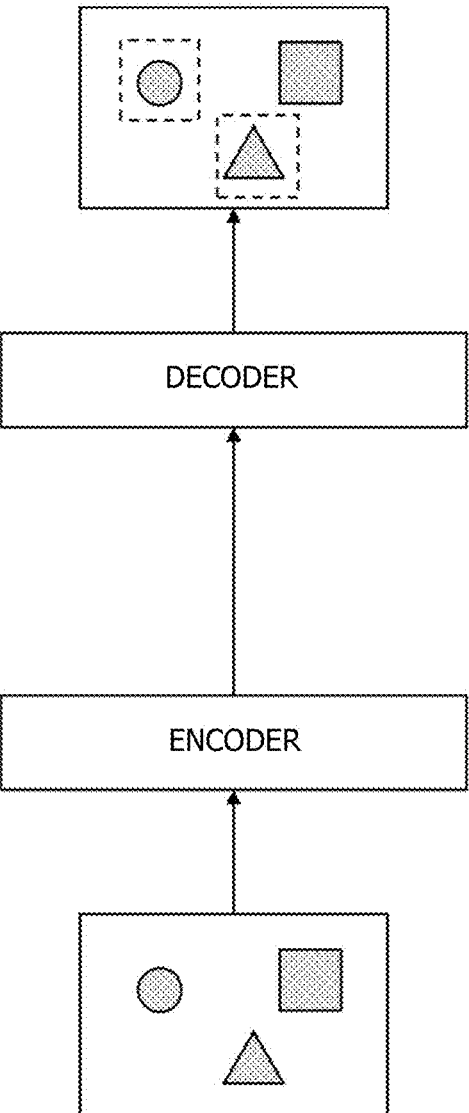
FIG. 17 is a diagram for describing a function of a common object detector.

This will be described more specifically. Commonly, as illustrated in FIG. 17, positions and categories of detection objects are estimated by a decoder based on features extracted by an encoder from an input image. In other words, parameters indicating features of the detection objects ("circle" and "triangle" in the example in FIG. 17) are embedded in the decoder by training using training data with position information, and the decoder extracts the detection objects from the image and estimates positions of these objects. On the other hand, the object detection device according to the present embodiment cuts out a part of a role of the decoder illustrated in FIG. 17 as a module, and for example, as illustrated in FIG. 8, the module is arranged as the module 322 between the encoder 321 and the decoder 323. The module 322 provides a mark to a region of a specific object of the image feature matrix 56. The object to which the mark is provided by the module 322 is determined by a method of giving training data. In other words, input to the decoder 323 changes depending on the intermediate module 322 even when input images are the same. Then, regardless of what the detection object is, the decoder 323 itself uses a region specified by the module, in other words, a region to which the mark is provided, as a processing object, and estimates a position of the region.

Therefore, according to the present embodiment, the detection object may be added or changed only by selecting a desired module according to the object desired to be detected and combining the module with the decoder to generate the object detector, and retraining of the entire object detector is unnecessary. As described above, since the retraining of the entire object detector is not performed and each module is independent, detection accuracy of the existing object detector is not affected. Furthermore, since training data without position information may be used for the training of the module, it is not needed to prepare training data in which position information is annotated.

Figure 18:
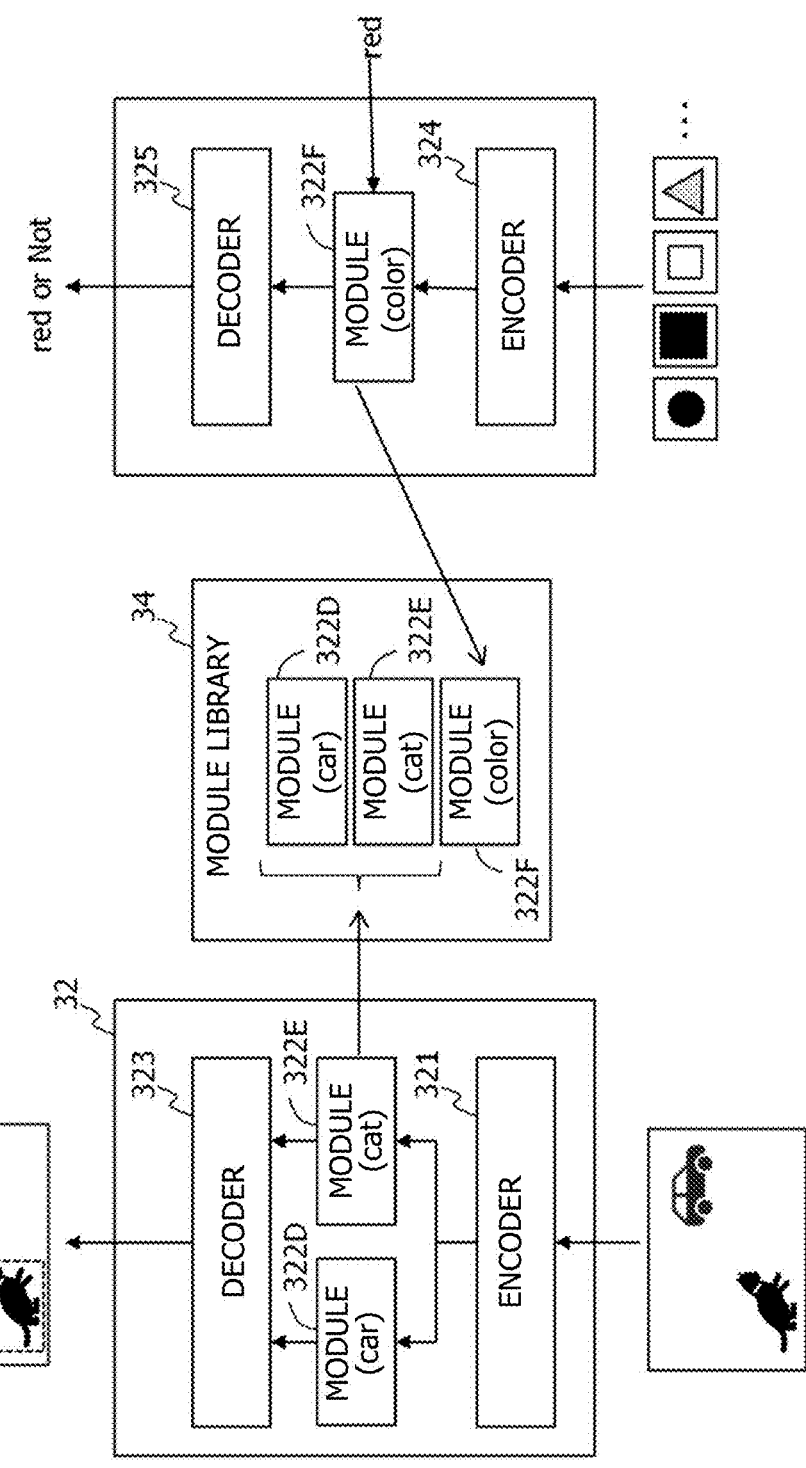
FIG. 18 is a diagram for describing enlargement of an object by a combination of modules.

Moreover, it is also possible to further limit the detection object by combining a plurality of modules. The description will be made by using a specific example. As illustrated in a left diagram in FIG. 18, the object detection device trains the object detector 32 including the encoder 321, the modules 322, and the decoder 323 with training data with position information. In the example in FIG. 18, the modules 322 are a module 322D whose object is "car" and a module 322E whose object is "cat". When the training of the object detector 32 is completed, the modules 322D and 322E are stored in the module library 34. Furthermore, as illustrated in a right diagram in FIG. 18, the object detection device trains a machine learning model including the encoder 324, a module 322F, and the decoder 325 by using training data without position information. In the example in FIG. 18, the module 322F is the module 322 for specifying a region of an object of a specific color. The specific color (in the example in FIG. 18, "red") is given by an argument.

Figure 19:
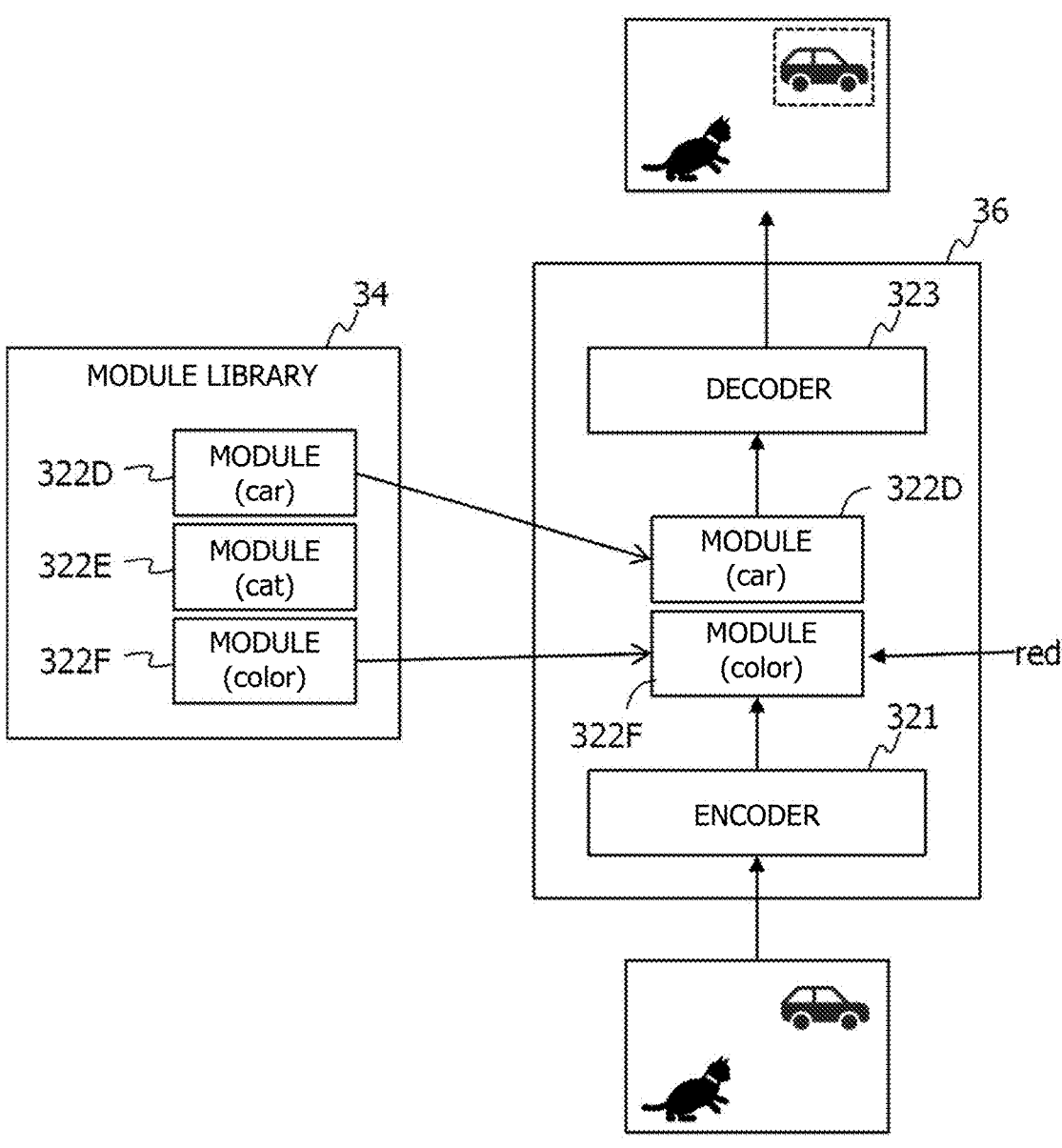
FIG. 19 is a diagram for describing the enlargement of the object by the combination of the modules.

For example, as in the object detector 32, by combining the module 322D and the module 322E in parallel, "car" and "cat" become detection objects under an OR condition. Furthermore, for example, as illustrated in FIG. 19, by combining the module 322D and the module 322F in series, "car" and "color" become detection objects under an AND condition. Then, by giving the argument "red" to the module 322F, "red car" may be set as the detection object. In this case, a mark by the module 322D and a mark by the module 322F may be superimposed and added to each element of the image feature matrix 56.

Figure 20:
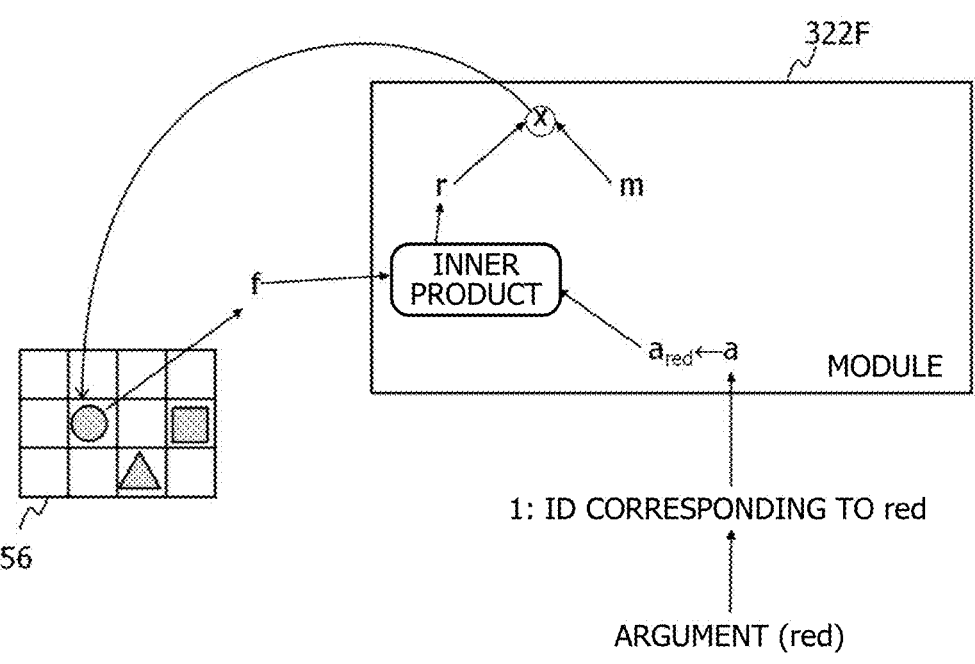
FIG. 20 is a diagram for describing processing of the module in a case where an argument is given.

Note that, in a case where the argument is given to the module 322, the object detection device trains a vector a held by the module 322F so as to obtain a vector $\partial_{red}$ representing a feature of the object "red" by giving an identifier (ID) corresponding to the argument "red" as illustrated in FIG. 20. Then, when the mark is provided to the element of the image feature matrix 56, the object detection device calculates a value to be added to a value of the element of the image feature matrix 56 similarly to the case described with reference to FIG. 9, by using the vector $\partial_{red}$.

Note that, in the embodiment described above, the case has been described where the training data without position information is used as the training data used for the training of the module, but the present embodiment is not limited to this, and the training data with position information may be used.

Furthermore, in the embodiment described above, the case has been described where the object detection device includes the machine learning unit and the detection unit, but the present embodiment is not limited to this. A machine learning device including the functional unit of the machine learning unit and a detection device including the functional unit of the detection unit may be implemented by different computers from each other.

Furthermore, while the object detection program is previously stored (installed) in the storage device in the embodiment described above, the present embodiment is not limited to this. The program according to the disclosed technology may be provided in a form stored in a storage medium such as a compact disc read only memory (CD-ROM), a digital versatile disc read only memory (DVD-ROM), or a universal serial bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an object detection program for causing a computer to execute processing comprising:

acquiring, from a memory of the computer, first training data in which a first object is labeled in an image and first position information regarding the first object is not labeled;

training, based on the first training data in which the first position information regarding the first object is not labeled, a first machine learning model including a first machine learning model portion that specifies a region in an image that includes the first object;

acquiring, from the memory, second training data in which second position information regarding a second object is labeled;

training, based on the second training data in which the second position information is labeled, a second machine learning model including a second machine learning model portion and a third machine learning model portion;

generating a third machine learning model by combining the first machine learning model portion of the first machine learning model and the third machine learning model portion of the second machine learning model, the second machine learning model portion being a machine learning model portion that specifies a region in an image that includes the second object, the third machine learning model portion being a machine learning model portion that determines a position in an image of a specified region, wherein the generated third machine learning model is configured to detect, in response to inputting an input image to the third machine learning model, the first object in the input image and a position of the first object in the input image; and outputting a detection result of an object by inputting an image to the third machine learning model.

2. The non-transitory computer-readable recording medium according to claim 1, wherein the outputting of the detection result of the object includes outputting the position in the image determined by the third machine learning model portion and information that indicates that the region is the first object based on the region in the image specified by the first machine learning model portion.

3. The non-transitory computer-readable recording medium according to claim 2, wherein the specifying of the region in the image that includes the first object by the first machine learning model portion includes providing information to a feature matrix by reflection of similarity between a feature indicated by each element of the feature matrix obtained by compression of an image and a feature indicated by the first machine learning model portion, in each element, and the determining of the position in the image of the specified region by the third machine learning model includes calculating coordinates of the image that corresponds to an element whose value satisfies a predetermined condition in the feature matrix in which the similarity is reflected in each element.

4. The non-transitory computer-readable recording medium according to claim 1, the processing further including generating a fourth machine learning model by combination of a machine learning model portion group obtained by combination of the first machine learning model portion and the second machine learning model portion in parallel with the third machine learning model portion, wherein the outputting of the detection result includes outputting, as the detection result of the object, detection results for the first object and the second object.

5. The non-transitory computer-readable recording medium according to claim 1, the processing further including generating a fourth machine learning model by combination of a machine learning model portion group obtained by combination of the first machine learning model portion and the second machine learning model portion in series with the third machine learning model portion, wherein the outputting of the detection result includes outputting, as the detection result of the object, a detection result for an object that has a feature obtained by combination of a feature of the first object and a feature of the second object.

6. An object detection apparatus comprising:

a memory; and a processor coupled to the memory, the processor being configured to perform processing including:

acquiring, from a memory of the computer, first training data in which a first object is labeled in an image and first position information regarding the first object is not labeled;

training, based on the first training data in which the first position information regarding the first object is not labeled, a first machine learning model including a first machine learning model portion that specifies a region in an image that includes the first object;

acquiring, from the memory, second training data in which second position information regarding a second object is labeled;

training, based on the second training data in which the second position information is labeled, a second machine learning model including a second machine learning model portion and a third machine learning model portion;

generating a third machine learning model by combining the first machine learning model portion of the first machine learning model and the third machine learning model portion of the second machine learning model, the second machine learning model portion being a machine learning model portion that specifies a region in an image that includes the second object, the third machine learning model portion being a machine learning model portion that determines a position in an image of a specified region, wherein the generated third machine learning model is configured to detect, in response to inputting an input image to the third machine learning model, the first object in the input image and a position of the first object in the input image; and outputting a detection result of an object by inputting an image to the third machine learning model.

7. A machine learning model generation method implemented by a computer, the machine learning model generation method comprising:

acquiring, from a memory of the computer, first training data in which a first object is labeled in an image and first position information regarding the first object is not labeled;

training, based on the first training data in which the first position information regarding the first object is not labeled, a first machine learning model including a first machine learning model portion that specifies a region in an image that includes the first object;

acquiring, from the memory, second training data in which second position information regarding a second object is labeled;

training, based on the second training data in which the second position information is labeled, a second machine learning model including a second machine learning model portion and a third machine learning model portion;

generating a third machine learning model by combining the first machine learning model portion of the first machine learning model and the third machine learning model portion of the second machine learning model, the second machine learning model portion being a machine learning model portion that specifies a region in an image that includes the second object, the third machine learning model portion being a machine learning model portion that determines a position in an image of a specified region, wherein the generated third machine learning model is configured to detect, in response to inputting an input image to the third machine learning model, the first object in the input image and a position of the first object in the input image; and outputting a detection result of an object by inputting an image to the third machine learning model.

* * * * *